(12) United States Patent
Jespersen et al.

(10) Patent No.: US 8,804,233 B2
(45) Date of Patent: Aug. 12, 2014

(54) FIBER ASSEMBLY FOR ALL-FIBER DELIVERY OF HIGH ENERGY FEMTOSECOND PULSES

(75) Inventors: Kim Jespersen, Lyngby (DK); Lars Grüner-Nielsen, Bronshoj (DK)

(73) Assignee: OFS Fitel, LLC, Norcross, GA (US)

( * ) Notice: Subject to any disclaimer, the term of this patent is extended or adjusted under 35 U.S.C. 154(b) by 528 days.

(21) Appl. No.: 13/206,179

(22) Filed: Aug. 9, 2011

(65) Prior Publication Data

US 2013/0038923 A1 Feb. 14, 2013

(51) Int. Cl.
| | |
|---|---|
| *H01S 3/067* | (2006.01) |
| *H01S 3/23* | (2006.01) |
| *H01S 3/08* | (2006.01) |
| *H01S 3/16* | (2006.01) |

(52) U.S. Cl.
CPC ........... *H01S 3/2308* (2013.01); *H01S 3/06741* (2013.01); *H01S 3/0804* (2013.01); *H01S 3/06725* (2013.01); *H01S 3/1611* (2013.01); *H01S 3/1618* (2013.01)
USPC ........................................................ 359/346

(58) Field of Classification Search
CPC .............. H01S 3/06741; H01S 3/2308; G02B 6/02304; G02B 6/02309
See application file for complete search history.

(56) References Cited

U.S. PATENT DOCUMENTS

| | | | |
|---|---|---|---|
| 5,847,863 A * | 12/1998 | Galvanauskas et al. ... | 359/341.3 |
| 5,862,287 A * | 1/1999 | Stock et al. ................... | 385/123 |
| 6,822,978 B2 * | 11/2004 | Kafka et al. .................... | 372/18 |
| 6,845,204 B1 * | 1/2005 | Broeng et al. ................. | 385/126 |
| 7,330,301 B2 * | 2/2008 | Harter ............................ | 359/333 |
| 7,826,499 B2 * | 11/2010 | Nicholson et al. ................ | 372/6 |
| 8,175,436 B2 * | 5/2012 | Ramachandran ............. | 385/123 |
| 8,554,035 B2 * | 10/2013 | Xu et al. ........................ | 385/122 |
| 2001/0024546 A1 * | 9/2001 | Kafka et al. ..................... | 385/31 |
| 2002/0176676 A1 * | 11/2002 | Johnson et al. ................ | 385/125 |
| 2004/0258381 A1 * | 12/2004 | Borrelli et al. ................ | 385/125 |
| 2005/0111500 A1 * | 5/2005 | Harter et al. .................... | 372/25 |
| 2005/0157998 A1 * | 7/2005 | Dong et al. ................... | 385/126 |
| 2005/0226278 A1 * | 10/2005 | Gu et al. ........................... | 372/6 |
| 2007/0177641 A1 * | 8/2007 | Liu ................................ | 372/25 |
| 2012/0275180 A1 * | 11/2012 | Button et al. ................. | 362/558 |

* cited by examiner

*Primary Examiner* — Mark Hellner
*Assistant Examiner* — Ari M Diacou
(74) *Attorney, Agent, or Firm* — Mandelbaum Salsburg P.C.

(57) ABSTRACT

Embodiments of the present invention are generally related to a fiber assembly, for example, in a chirped pulse amplification system, for all-fiber delivery of high energy femtosecond pulses. More specifically, embodiments of the present invention relate to a system and method for improving dispersion management when using hollow core photonic bandgap fibers for pulse compression. In one embodiment of the present invention, a fiber assembly comprises: an optical laser oscillator; a first fiber section for stretching the pulses from the laser oscillator, the first fiber section comprising a high order mode fiber; and a second fiber section for compressing the stretched pulses, connected to the first fiber section via a splice, the second fiber section comprising a hollow core photonic bandgap fiber; wherein the fiber assembly outputs a pulse compression at less than 200 fs.

22 Claims, 3 Drawing Sheets

FIBER ASSEMBLY FOR ALL-FIBER DELIVERY OF HIGH ENERGY FEMTOSECOND PULSES

BACKGROUND

1. Field of the Invention

Embodiments of the present invention are generally related to a fiber assembly for all-fiber delivery of high energy femtosecond pulses. More specifically, embodiments of the present invention relate to a system and method for improving dispersion management when utilizing hollow core photonic bandgap fibers for pulse compression.

2. Description of the Related Art

Fiber optic delivery of femtosecond laser pulses is attractive for several reasons. An all-fiber delivery yields higher flexibility over traditional bulk optics, and a diffraction limited output, both of which are valuable properties in many applications, e.g., confocal and multiphoton microscopy. Additionally, an all-fiber delivery enables pulse delivery at places difficult to reach using conventional mirrors and lenses.

However, an all-fiber assembly for femtosecond laser pulses generally requires careful management of the dispersion and nonlinear properties of the fibers. One exemplary fiber type that is advantageous for ultrashort pulse applications is the air guiding hollow core photonic bandgap (PBG) fiber. The PBG fiber is known for its high nonlinear threshold, and at wavelengths around 800 nm and 1 μm, the dispersion of PBG fiber is anomalous, i.e. positive dispersion, which is significant factor for enabling fiber-based pulse compression of high energy ultrashort pulses.

One drawback associated with using PBG fibers for ultrashort pulse delivery has so far been limited to scientific demonstrations, although the fiber itself has been available several years. One reason for the lack of commercial availability of PBG fibers for such applications is a known problem with significant higher order dispersion, which cannot be eliminated by combination with standard single mode fibers. The dispersion slope of PBG fibers is typically large and positive, such that the relative dispersion slope (RDS), defined as dispersion slope divided by dispersion, becomes large and positive. Standard single mode fibers (SMF) have normal, i.e. negative, dispersion in the 800 nm and 1 μm range and a positive dispersion slope, and the RDS of SMF is therefore negative in the 800 nm and 1 μm range. The relative dispersion slope (RDS) between PBG fibers and SMF is opposite in sign such that there can be no RDS match between PBG fiber and SMF. As such, the practical use of the PBG fiber for pulse compression is currently limited to roughly greater than 200 fs, where its properties are acceptable.

Attempts of utilizing PBG fibers for shorter pulses have been made by combining the PBG fibers with a stretcher fiber, e.g., dispersion compensating stretcher fiber (DCF). While the attempted combination has showed some signs of success, there are still great limitations with respect to RDS matching between the two fibers, as well as overall power output of the fiber assembly since DCF's generally have low nonlinear threshold.

Thus, there is a need for an improved fiber assembly based on hollowcore PBG fibers for all-fiber delivery of high energy femtosecond pulses.

SUMMARY

Embodiments of the present invention are generally related to a fiber assembly for all-fiber delivery of high energy femtosecond pulses. More specifically, embodiments of the present invention relate to a system and method for improving dispersion management when using hollow core photonic bandgap fibers for pulse compression.

In one embodiment of the present invention, a fiber assembly comprises a pulse source, a first fiber section for receiving and stretching pulses from the pulse source, the first fiber section comprising a high order mode fiber, and a second fiber section for compressing the stretched pulses, connected to the first fiber section via a splice, the second fiber section comprising a hollow core photonic bandgap fiber, wherein the fiber assembly outputs a pulse compression at less than 200 fs.

In another embodiment of the present invention, a chirped pulse amplification system, comprises a pulse source, a first fiber section for stretching pulses from the pulse source, the first fiber section comprising a high order mode fiber, a second fiber section for compressing the stretched pulses, connected to the first fiber section via a splice, the second fiber section comprising a hollow core photonic bandgap fiber, and at least one amplification stage between the first fiber section and the second fiber section, wherein the high order mode fiber comprises a negative dispersion and negative dispersion slope at about 800 nm or at about 1000 nm, and wherein the relative dispersion slope of the high order mode fiber is substantially the same as the relative dispersion slope of the photonic bandgap fiber.

In yet another embodiment of the present invention, a method of providing an all-fiber delivery of high energy femtosecond pulses, comprises: providing a an all-fiber assembly comprising a first fiber section for stretching pulses received from a pulse source, the first fiber section comprising a high order mode fiber, and a second fiber section for compressing the stretched pulses, connected to the first fiber section via a splice, the second fiber section comprising a hollow core photonic bandgap fiber; generating an input pulse from the pulse source into the all-fiber assembly; and receiving an output pulse compression at less than 200 fs from the all-fiber assembly.

In a further embodiment, a method of compensating dispersion of a photonic bandgap fiber in a fiber assembly comprising: obtaining the dispersion characteristics of a photonic bandgap fiber at a frequency; obtaining the relative dispersion slope of the photonic bandgap fiber from the dispersion characteristics; matching the relative dispersion slope of the photonic bandgap fiber with a relative dispersion slope of a high order mode fiber; and coupling the photonic bandgap fiber with the high order mode fiber.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
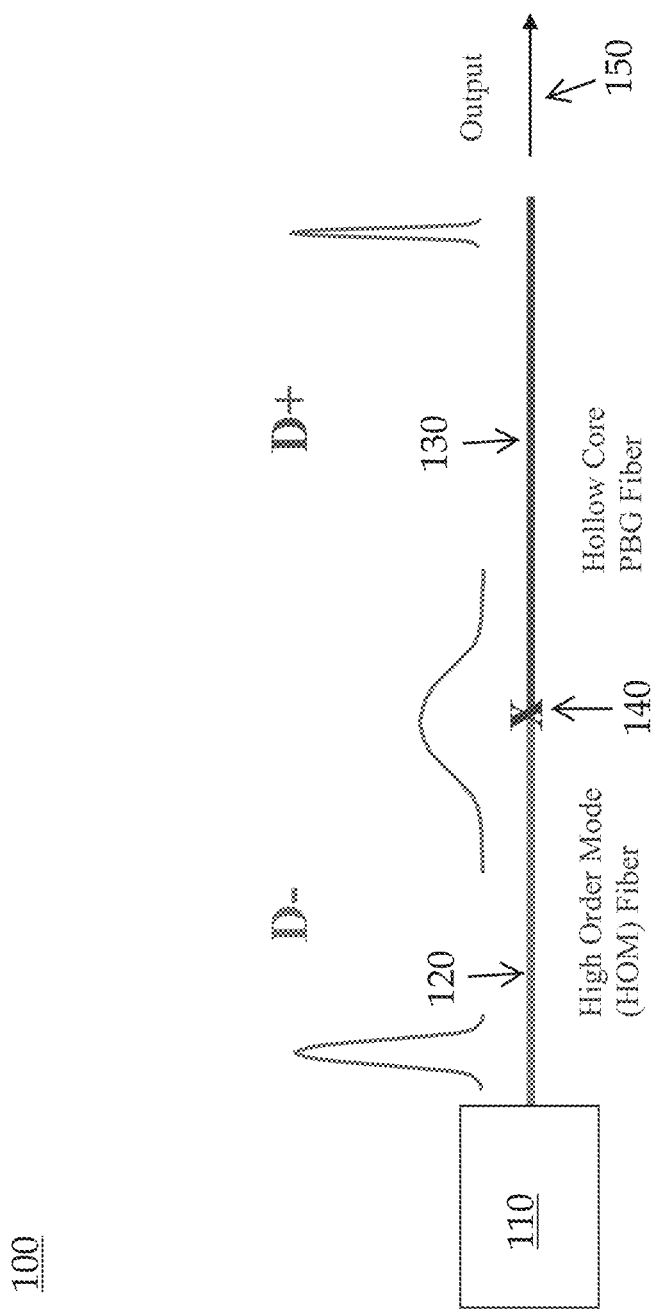
FIG. 1 depicts a schematic of a fiber assembly in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to a fiber assembly for all-fiber delivery of high energy femtosecond pulses. More specifically, embodiments of the present invention relate to a system and method for improving dispersion management when using hollow core photonic bandgap fibers for pulse compression.

Figure 1A:
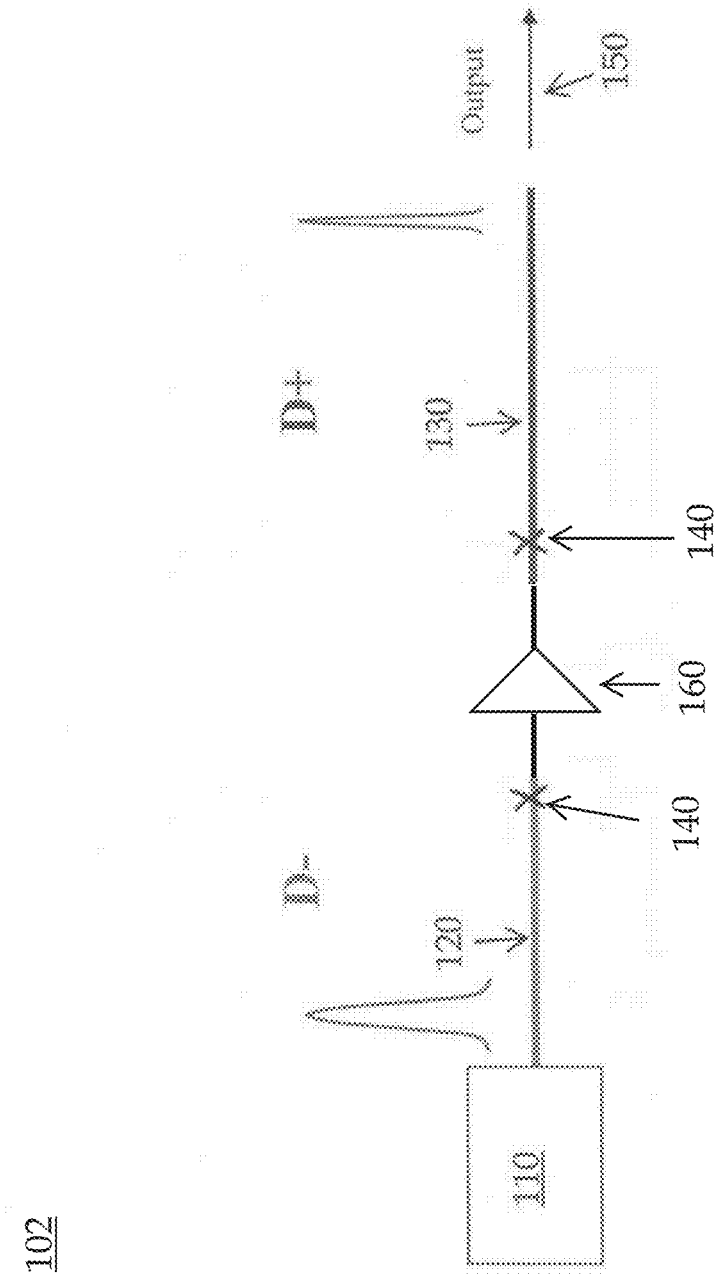
FIG. 1A depicts a schematic of a chirped pulse amplification fiber assembly in accordance with one embodiment of the present invention.

FIG. 1 depicts a schematic of a fiber assembly, in accordance with embodiments of the present invention, for use in a fiber system, e.g., in a chirped-pulse amplification system as shown in FIG. 1A. The fiber assembly 100 generally comprises a laser oscillator 110 or pulse generator, optically connected to a high order mode (HOM) fiber 120 that is optically connected to a hollow core photonic bandgap (PBG) fiber 130. The HOM fiber and PBG fiber may be connected using any known means suitable for embodiments of the present invention. In one embodiment, the HOM fiber and PBG fiber are connection via a splice 140, which may comprise a fusion splice, mechanical splice or the like. Alternatively, the splice 140 may comprise a lens coupling rather than a traditional splice.

As shown in FIG. 1A, one or more amplification stages 160 may be provided within the assembly 102, often positioned between the high order mode fiber 120 and the photonic bandgap fiber 130. The amplification stage may comprise any known component that may receive an input signal and generate an output signal with higher optical power. In many embodiments, the amplifier may comprise at least a laser diode in combination with a glass fiber doped with rare earth ions (e.g., erbium, neodymium, ytterbium, praseodymium, thulium, or the like). In other embodiments, any other known amplifier suitable for embodiments of the present invention may be utilized.

As understood by embodiments of the present invention, the HOM fiber may optionally comprise a segment of HOM fiber terminated on both ends with a mode converter, a pigtail fiber and/or the like. In such embodiments, the additional components may be necessary for coupling light from one mode to another. Common mode converters include long period gratings. However, in some embodiments of the present invention, where such mode conversion is not necessary, the HOM fiber may be spliced directly to the PBG fibers, utilizing any known splicing and/or coupling technique.

In many embodiments, the laser oscillator 110 generally comprises a modelocked oscillator. In one embodiment, the laser oscillator is capable of generating a pulse train with about 1 nJ/pulse to 10 nJ/pulse at about 800 nm, or about 1 nJ/pulse to 10 nJ/pulse at about 1 µm. In another embodiment a chirped pulse amplified system is capable of generating a pulse train with about several mJ/pulse at 800 nm and about 1 µJ/pulse to 100 µJ/pulse at 1 µm. For purposes of embodiments of the present invention, a wavelength may deviate within approximately 10% and be considered "about" a particular or desired wavelength (e.g., "about 1 µm" may include 900 nm up to 1100 nm).

The PBG fiber 130 generally acts to compress the stretched pulse after passing through the HOM fiber 120, described infra. In one embodiment, PBG fiber comprises the following performance characteristics at about 1060 nm, as selected from a fiber manufactured by NKT Photonics A/S, headquartered in Birkerod, Denmark, and sold under the designation HC-1060-02, the characteristics published as of Jul. 6, 2011.

The exemplary properties comprise:

$D(1060\ nm)=120\ ps/(nm\cdot km)$;

$S(1060\ nm)=1\ ps/(nm^2\cdot km)$;

$RDS=0.00833\ nm^{-1}$;

$\beta_2=-0.0716\ ps^2/m$; and $\beta_3=0.000436\ ps^3/m$.

Figure 2:
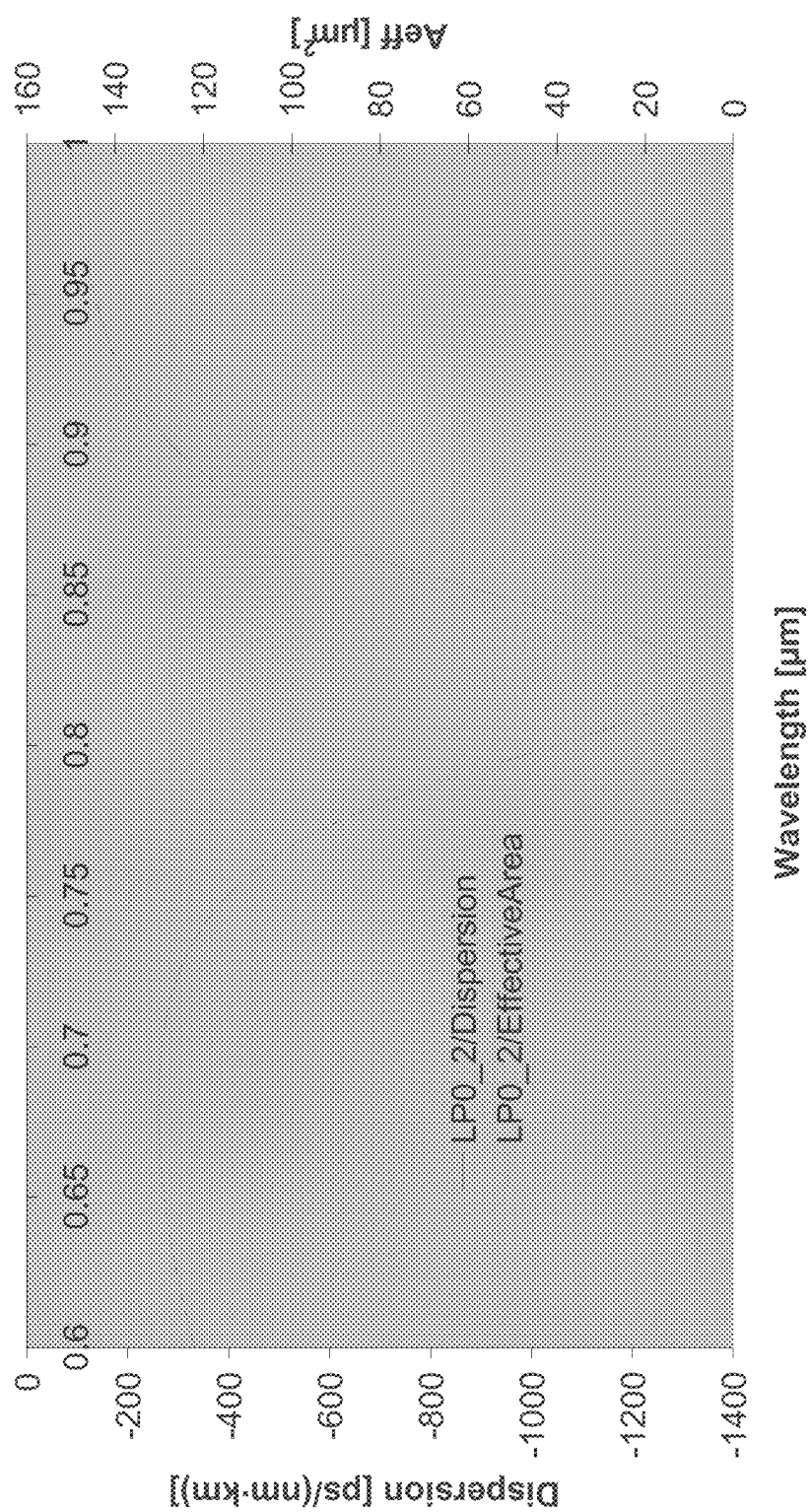
FIG. 2 depicts a graph showing dispersion and effective area of one exemplary high order mode fiber in accordance with one embodiment of the present invention.

The HOM fiber 120 generally acts to stretch the pulse coming from the laser oscillator 110. One exemplary HOM fiber 120, suitable for embodiments of the present invention, comprises performance characteristics as shown in FIG. 2. As shown in the Figure, in one exemplary embodiment, the dispersion and slope of the HOM fiber are negative at 800 nm rendering the properties suitable for the intended applications of embodiments of the present invention. In other embodiments however, the HOM fiber comprises a negative dispersion and negative dispersion slope at about 800 nm and at about 1000 nm.

In accordance with one embodiment of the present invention, the dispersion curve of the HOM fiber 120 may relate to a triple clad index profile having a core, a down-doped trench, an up-doped ring, and an outer cladding. The dispersion properties generally depend on the selection of width and index height for all parts of the index profile. The design must be such that the dispersion of the higher order mode is negative, i.e. normal, dispersion with RDS and if possible, relative dispersion curvature (RDC) values, discussed infra, matching that of the hollow core PBG in wavelength region including the operation wavelength. Specifically, a dip in the dispersion curve of the used higher order mode such that the operation wavelength is on the 'downhill' side of the dispersion dip is often utilized to ensure a negative dispersion slope and high degree of freedom in choosing the dispersion curvature at the operation wavelength.

In some embodiments, to match a different PBG fiber 130 or should different operational parameters of the laser oscillator 110 be selected, the dispersion curve of the HOM fiber 120 may optionally be shifted in wavelength within about 100 nm by scaling the radial dimension of the entire index profile. This could be done by changing the specific cross-sectional area (CSA) of the overcladding tube, in the fiber manufacturing process. As such, for a desired RDS value, the fiber assembly 100 may be realized without significant changes to the HOM fiber 120 design. For certain embodiments, this may be a an important feature as in current state-of-the-art PBG fiber fabrication it is difficult to control small but important deformations in the microstructure, which can alter the dispersion properties.

Optionally, the fiber assembly 100 may further comprise a third or additional fiber (not shown), such as a single mode fiber (SMF) for fine tuning a desired overall dispersion slope of the fiber assembly 100.

As shown in FIG. 2, another advantageous property is discovered with the HOM fiber 120, in the form of the relatively high effective dispersion area product (Aeff*D), which ensures high power operation, e.g., at about 1 nJ. Such power capability is significantly greater and more useful in many applications than previously known fiber assemblies, such that embodiments of the present invention may yield nearly 10-times, or one order of magnitude, greater power than known assemblies.

As used herein, and often understood in the industry, dispersion is generally quantified using two equivalent representations and transformation between the two is well-defined. The two representations are:

(1) Dispersion as quantified by 'D' with units of ps/(nm·km). The dispersion slope 'S' is the derivative of D with respect to wavelength with units ps/(nm$^2$·km). The dispersion curvature 'C' is the $2^{nd}$ derivative of D with respect to wavelength with units ps/(nm$^3$·km). Dispersion slope and curvature are conveniently normalized as relative dispersion slope (RDS) and relative dispersion curvature (RDC) where RDS=S/D and RDC=C/D.

(2) Dispersion as related to the Taylor expansion of the propagation constant such that second order dispersion is quantified by '$\beta_2$', known as the group velocity dispersion (GVD) with units ps$^2$/m, third order dispersion (TOD) by '$\beta_3$' with units ps$^3$/m, fourth order dispersion (FOD) by '$\beta_4$' with units ps$^4$/m, etc.

In operation, various additional properties may be considered when designing the all-fiber assembly, such as the length of each of the fibers. For example, to balance second order dispersion, third order dispersion, and fourth order dispersion the following criteria should be fulfilled:

$$\Sigma \beta_2 l + GDD_0 = 0 \quad (1)$$

$$\Sigma \beta_3 l + TOD_0 = 0 \quad (2)$$

$$\Sigma \beta_4 l + FOD_0 = 0 \quad (3)$$

Where the sum is over the HOM fiber and hollow core PBG fiber, as well as any additional fiber that may be present in the system. $GDD_0$ is the chirp of the input pulse and $TOD_0$ and $FOD_0$ are the third and fourth order chirp of the input pulse. 'l' is fiber length. If the input pulse would be Fourier Transform limited then $GDD_0 = TOD_0 = FOD_0 = 0$.

Generally, fiber lengths of the HOM fiber and PBG fiber should be trimmed such that the group delay dispersion (GDD) or accumulated dispersion is zero and the accumulated TOD and FOD as low as possible. If the higher order dispersion cannot be balanced completely with the fiber assembly then a third fiber such as a standard single mode fiber that has $\beta_2 > 0$ and $\beta_3 > 0$ could be included to account for the residual TOD, for example. However, in this example the third fiber section may typically already be included in the fiber pigtail of the laser system and is therefore included in the $GDD_0$ and $TOD_0$ mentioned above.

When designing a fiber assembly in accordance with embodiments of the present invention, the matching of the RDS between the first fiber (i.e., HOM fiber) and the second fiber (i.e., PBG fiber) is a significant design parameter to yield optimal results. While the term "matching" is used, it is appreciated that similar RDS may be sufficient in lieu of an ideal or identical match. In addition to the RDS match, the relative dispersion curvature (RDC) of the two fibers may be matched for suitable results. As understood by embodiments of the present invention, matching the RDC is equivalent to a fourth order dispersion match between the fibers. While matching the RDS of the HOM fiber to that of the PBG fiber is sufficient to yield a suitable assembly in accordance with the embodiments of the present invention, additional matching of the RDC will further reduce the effect of higher order dispersion.

In many embodiments of the present invention, the resulting output of the fiber assembly 100 is ultrashort pulses, which include pulses of less than about 200 fs. In addition, embodiments of the present invention provide a higher effective area than known assemblies, allowing for broader and more flexible applications of embodiments of the present invention.

In an alternative embodiment of the present invention, a method of compensating the dispersion of PBG fibers may be implemented by utilizing the HOM fiber matching techniques disclosed herein. Whereas the controlling the dispersion properties of PBG fibers can often be difficult, as described supra, the technique of matching the HOM fiber using RDS parameters and, if possible, RDC parameters, may be utilized to achieve desired dispersion properties. In accordance with such embodiments, the dispersion compensation technique may be utilized for nearly any application where PBG fibers may normally be employed.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional clients and servers, as particular applications may require.

What is claimed is:

1. A fiber assembly comprising:
   a pulse source;
   a first fiber section for receiving and stretching pulses from the pulse source, the first fiber section comprising a high order mode fiber; and
   a second fiber section for compressing the stretched pulses, connected to the first fiber section via a splice, the second fiber section comprising a hollow core photonic bandgap fiber;
   wherein the fiber assembly outputs a pulse compression at less than 200 fs.

2. The fiber assembly of claim 1, wherein the pulse source comprises a modelocked oscillator producing pulses at one of either about 800 nm or about 1000 nm.

3. The fiber assembly of claim 2, further comprising at least one amplification stage between the first fiber section and the second fiber section.

4. The fiber assembly of claim 1, wherein the high order mode fiber comprises a negative dispersion and negative dispersion slope at about 800 nm and at about 1000 nm.

5. The fiber assembly of claim 1, wherein the relative dispersion slope of the high order mode fiber is substantially the same as the relative dispersion slope of the photonic bandgap fiber.

6. The fiber assembly of claim 1, wherein the relative dispersion curvature of the high order mode fiber is substantially the same as the relative dispersion curvature of the photonic bandgap fiber.

7. The fiber assembly of claim 1, wherein the photonic bandgap fiber, at about 1000 nm, comprises the properties:

$D(1060 \text{ nm}) = 120 \text{ ps/(nm·km)}$;

$S(1060 \text{ nm}) = 1 \text{ ps/(nm}^2\text{·km)}$;

$RDS = 0.00833 \text{ nm}^{-1}$;

$\beta_2 = -0.0716 \text{ ps}^2/\text{m}$; and $\beta_3 = 0.000436 \text{ ps}^3/\text{m}$.

8. The fiber assembly of claim 1, further comprising an overcladding tube on the high order mode fiber, wherein a modification to the overcladding cross-sectional area shifts a dispersion curve of the high order mode fiber up to about 100 nm, while substantially preserving the dispersion curve.

9. A chirped pulse amplification system, comprising:
   a pulse source;
   a first fiber section for stretching pulses from the pulse source, the first fiber section comprising a high order mode fiber;
   a second fiber section for compressing the stretched pulses, connected to the first fiber section via a splice, the second fiber section comprising a hollow core photonic bandgap fiber; and
   at least one amplification stage between the first fiber section and the second fiber section;
   wherein the high order mode fiber comprises a negative dispersion and negative dispersion slope at about 800 nm or at about 1000 nm, and wherein the relative dispersion slope of the high order mode fiber is substantially the same as the relative dispersion slope of the photonic bandgap fiber.

10. The chirped pulse amplification system of claim 9, wherein the pulse source is a modelocked laser oscillator.

11. The chirped pulse amplification system of claim 10, wherein the modelocked laser oscillator operates at about 1060 nm.

12. The chirped pulse amplification system of claim 9, wherein the photonic bandgap fiber, at 1060 nm, comprises the properties:

$D(1060 \text{ nm}) = 120 \text{ ps}/(\text{nm} \cdot \text{km})$;

$S(1060 \text{ nm}) = 1 \text{ ps}/(\text{nm}^2 \cdot \text{km})$;

$\text{RDS} = 0.00833 \text{ nm}^{-1}$;

$\beta_2 = -0.0626 \text{ ps}^2/\text{m}$; and $\beta_3 = 0.000675 \text{ ps}^3/\text{m}$.

13. The chirped pulse amplification system of claim 9, further comprising an overcladding on the high order mode fiber, wherein a modification to the overcladding cross-sectional area shifts a dispersion curve of the high order mode fiber up to about 50 nm, while substantially preserving the dispersion curve.

14. The chirped pulse amplification system of claim 9, wherein the fiber assembly outputs a pulse compression at less than 200 fs.

15. The chirped pulse amplification system of claim 9, wherein the relative dispersion curvature of the high order mode fiber is substantially the same as the relative dispersion curvature of the photonic bandgap fiber.

16. A method of providing an all-fiber delivery of high energy femtosecond pulses, comprising:
   providing an all-fiber assembly comprising:
      a first fiber section for stretching pulses received from a pulse source, the first fiber section comprising a high order mode fiber; and
      a second fiber section for compressing the stretched pulses, connected to the first fiber section via a splice, the second fiber section comprising a hollow core photonic bandgap fiber;
   generating an input pulse from the pulse source into the all-fiber assembly; and
   receiving an output pulse compression at less than 200 fs from the all-fiber assembly.

17. The method of claim 16, further comprising amplifying the pulse at an amplification stage between the first fiber and the second fiber.

18. The method of claim 16, wherein the high order mode fiber comprises a negative dispersion and negative dispersion slope at about 800 nm or at about 1000 nm.

19. The method of claim 16, wherein the relative dispersion slope of the high order mode fiber is substantially the same as the relative dispersion slope of the photonic bandgap fiber.

20. The method of claim 16, wherein the relative dispersion curvature of the high order mode fiber is substantially the same as the relative dispersion curvature of the photonic bandgap fiber.

21. A method of compensating dispersion of a photonic bandgap fiber in a fiber assembly comprising:
   obtaining the dispersion characteristics of a photonic bandgap fiber at a frequency;
   obtaining the relative dispersion slope of the photonic bandgap fiber from the dispersion characteristics;
   matching the relative dispersion slope of the photonic bandgap fiber with a relative dispersion slope of a high order mode fiber; and
   coupling the photonic bandgap fiber with the high order mode fiber.

22. The method of claim 21, further comprising:
   matching the relative dispersion curvature of the photonic bandgap fiber with a relative dispersion curvature of a high order mode fiber.

* * * * *